INVENTOR:
Charles H. Smoot,
BY
ATTORNEYS.

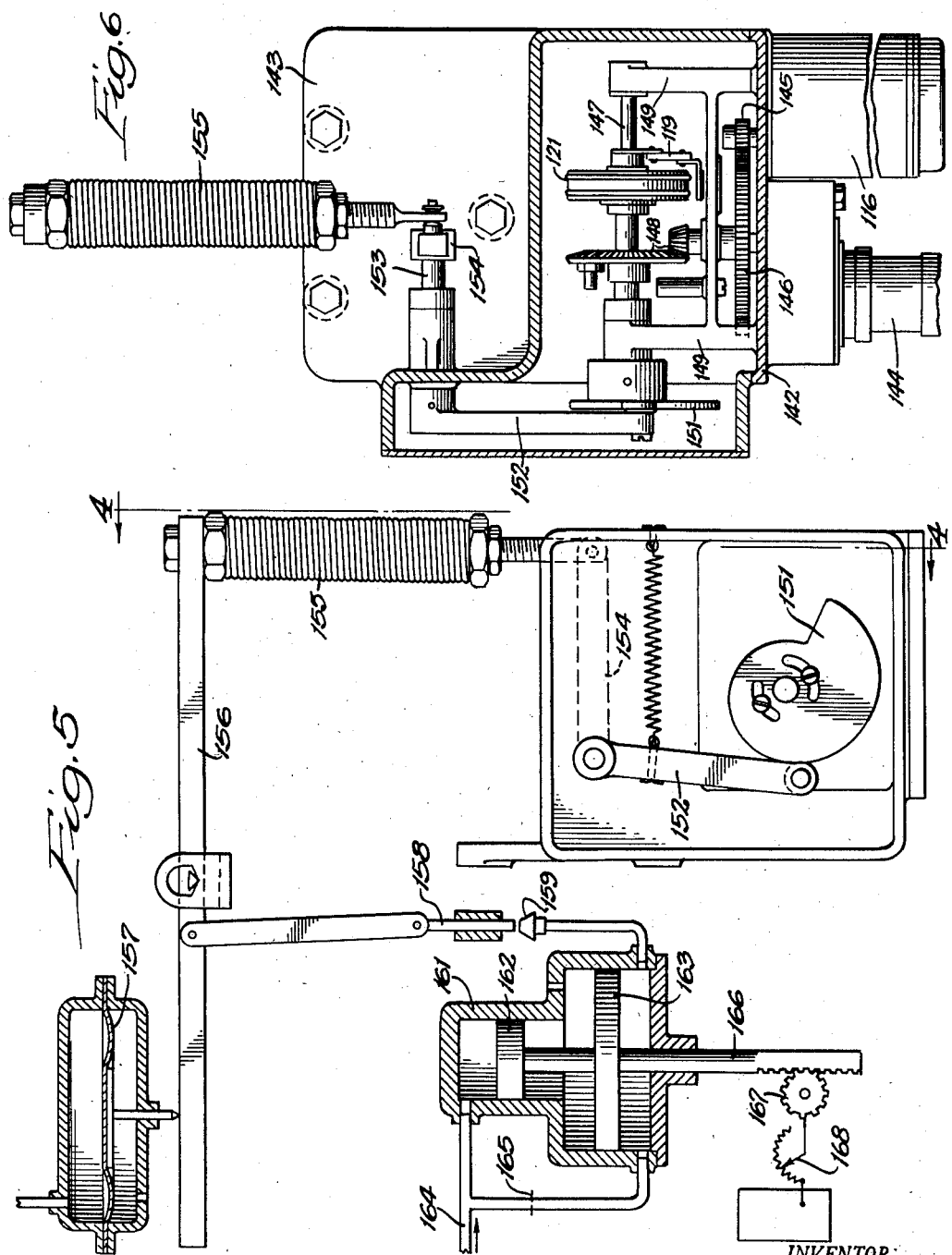

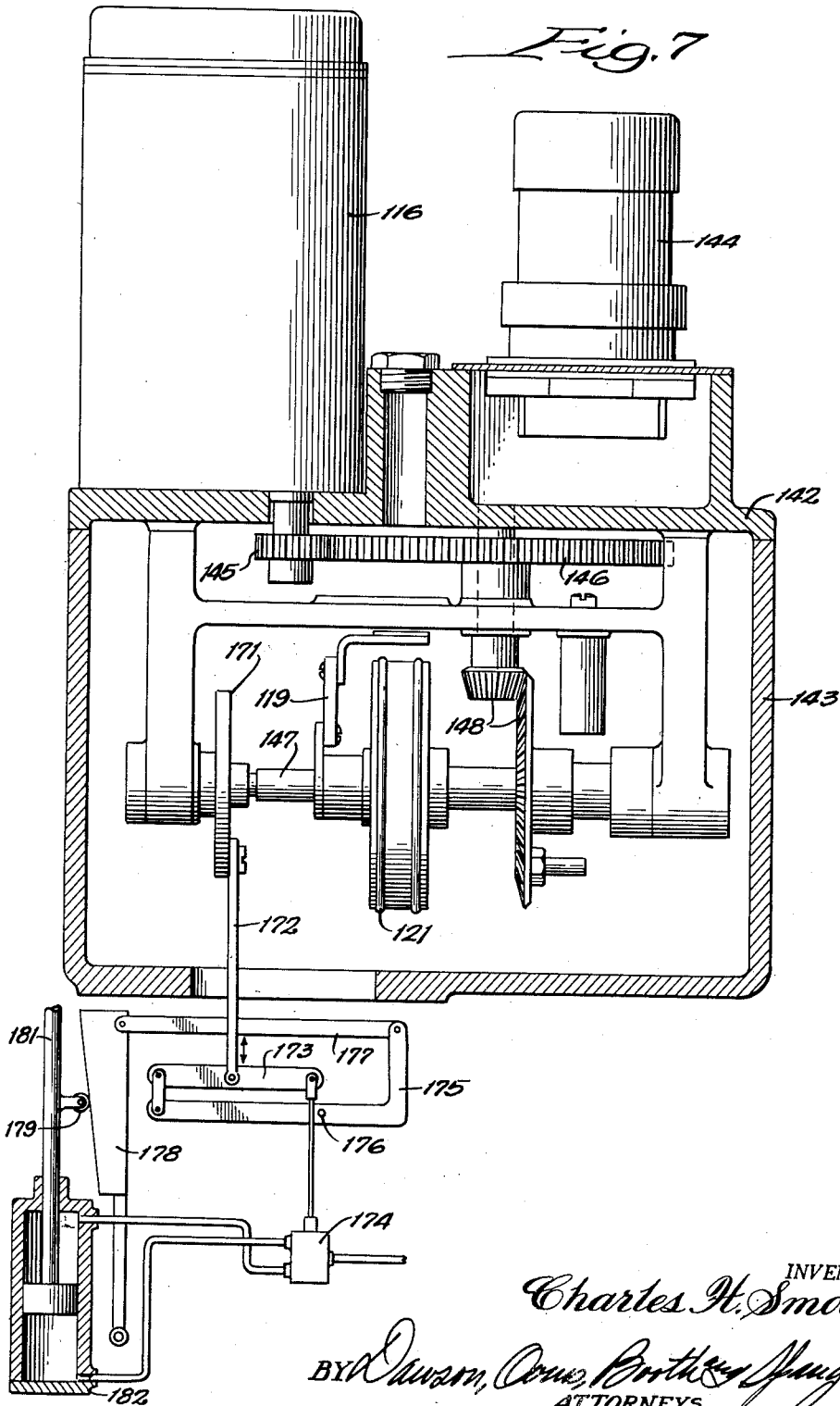

Patented July 7, 1953

2,644,642

UNITED STATES PATENT OFFICE 2,644,642

CONTROL SYSTEM FOR A PLURALITY OF RELATED VARIABLES

Charles H. Smoot, Chicago, Ill., assignor to Republic Flow Meters Company, Chicago, Ill., a corporation of Illinois Application May 18, 1949, Serial No. 94,010

8 Claims. (Cl. 236—26)

1

This invention relates to control systems and more particularly to electrical systems for controlling a plurality of related variables such, for example, as the supply of fuel and air to a furnace for combustion or the supply of factors contributing to an industrial process or the like.

Control systems have heretofore been operated for the most part by fluid under pressure such as air which is transmitted through conduits to various points in a plant to effect control operations. In large plants the conduits become extremely long, and the time required to transmit a pressure change therethrough induces an undesirable time lag into the system. Furthermore, the installation of a large number of conduits together with the necessary pumps and accessories required for a fluid pressure system becomes relatively expensive and is undesirable in various types of plants.

It is accordingly one of the objects of the present invention to provide a control system in which all of the control forces or impulses are transmitted electrically so that time lag in the system is eliminated. According to one feature of the invention the system functions without contactors, commutators or slip rings in the power circuit so that it is extremely reliable and requires a minimum of maintenance.

Another object is to provide a control system in which alternating current is utilized throughout the system both for control and for power.

Still another object is to provide a control system which can easily and quickly be converted from automatic to manual control and vice versa with a minimum of disturbance to the system.

Still another object is to provide a control system in which a single adjustable electric device effects a proportionate control of a plurality of devices to be controlled. Preferably a primary variable impedance is connected in parallel to a plurality of impedance elements which are, in turn, connected respectively through bridge circuits to secondary variable impedances adjusted by regulators for factors affecting the condition and which are, in turn, controlled respectively by unbalance in the bridge circuits.

A further object is to provide a control system in which the voltages developed across one impedance element in each of a plurality of bridge circuits are added and are utilized as a loading force for controlling additional factors affecting the condition. In the preferred construction the voltages are added in coupled coils and the total voltage is applied as a loading force to a regulator functioning as a primary or master control regulator in a second control system.

2

The above and other objects and advantages of the invention will be more readily apparent when read in connection with the accompanying drawings, in which—

Figure 5 is a diagrammatic view of a metering type regulator;

Figure 6 is a view at right angles to Figure 5 with parts shown in section; and

Figure 7 is a view similar to Figure 6 of a positioning type regulator.

Figure 1:
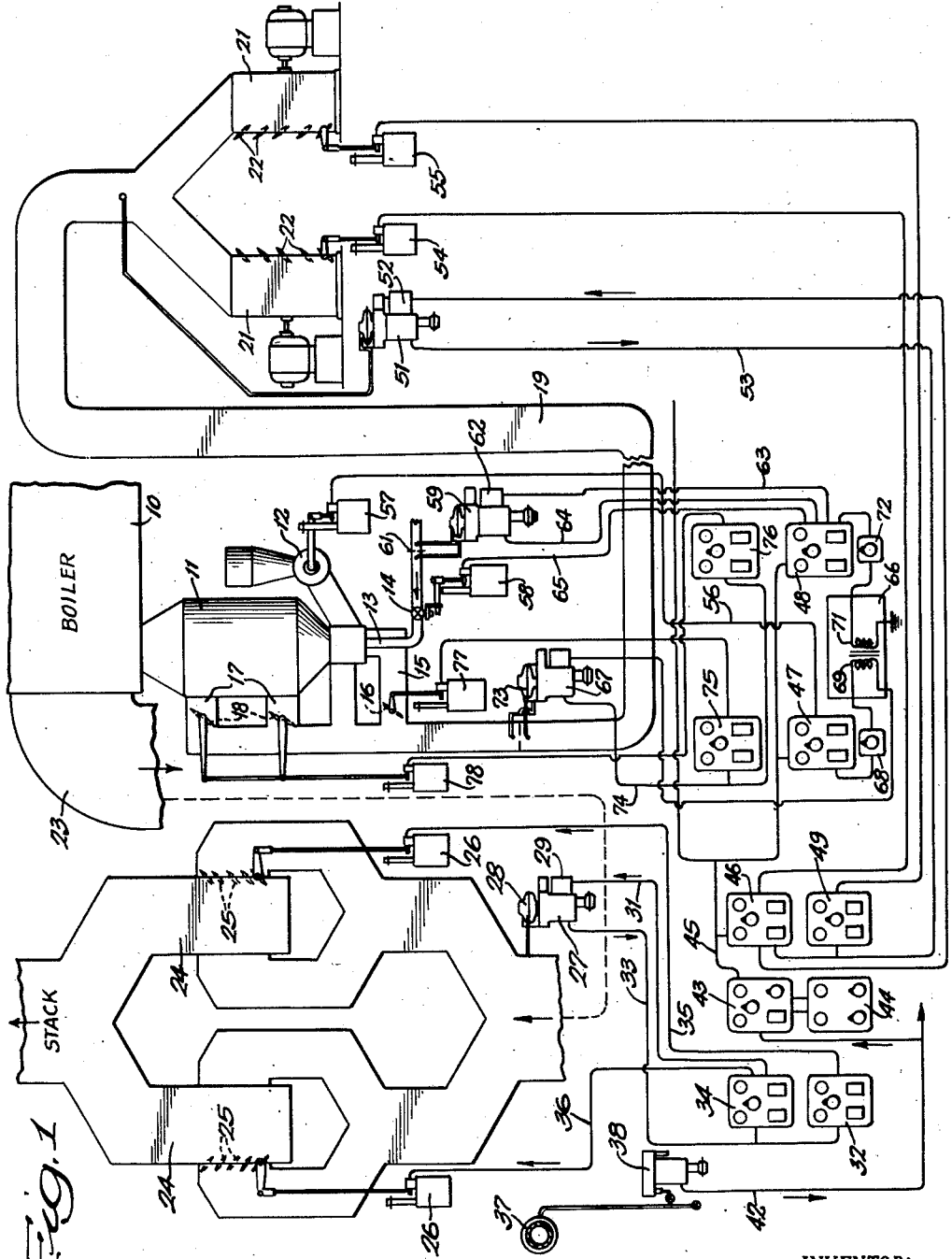
Figure 1 is a diagrammatic view of a steam boiler embodying a control according to the present invention.

As shown in Figure 1, the control system of the present invention is applied to a boiler indicated generally at 10 heated by a cyclone type furnace 11 which is supplied with fuel from a fuel metering device 12. In addition to the fuel supplied by the device 12 which may be coal, the furnace may receive a secondary fuel such as gas through a conduit 13 under the control of a valve 14. Primary air is supplied to the furnace through a conduit 15 under the control of a valve 16, and secondary air is supplied through parallel conduits 17 controlled by valves 18. The primary and secondary air are received through a common air manifold 19 which is supplied by a pair of forced draft blowers 21 having valves or louvers 22 to control the admission of air thereto. Combustion gases from the furnace are exhausted from the furnace through a flue 23 connected to a pair of induced draft blowers 24 having control valves or louvers 25.

The induced draft control

The induced draft system is controlled independently of the remainder of the system to maintain the furnace draft at a constant manually adjustable value. For this purpose each of the valves or louvers 25 is connected to a position type regulator 26 which adjusts the valves or louvers to produce the desired pressure in the flue 23. This pressure is measured by a metering type regulator 27 having a diaphragm 28 therein connected to the flue 23 to sense the pressure in the flue. The regulator may be generally similar to that more particularly described and claimed in Smoot Reissue Patent No. 16,507 except that its power unit instead of adjusting a valve or the like adjusts a potentiometer resistance or similar variable electrical device and except that instead of being loaded by a fluid pressure, as described in the Smoot reissue patent, the regulator is loaded electrically as described more fully hereinafter. For loading, the regulator is supplied with an electrical loading unit receiving loading voltage through a lead 31 from a control panel 32 containing a variable electrical device which can be manually adjusted to set the regulator at a predetermined value at which it will thereafter tend to maintain the induced draft pressure.

The regulator 27 contains a primary variable electrical device such as a potentiometer whose variable tap is connected through a lead 33 to the panel 32 and to a similar panel 34. The panels 32 and 34, as described more fully hereinafter, contain adjustable devices through which the ratio of the voltages transmitter thereby can be adjusted and which can, if desired, be switched to manual control when it is desired to control the induced draft valves manually. The panel 32 is connected through a lead 35 to one of the regulators 26, and the panel 34 is similarly connected through a lead 36 to the other regulator 26.

When the furnace pressure is at the value for which the regulator 27 is loaded, the valves 25 will be so adjusted as to maintain the pressure at this value. If the pressure should change, the change will immediately be sensed by the regulator 27 which will change the voltage transmitted through the line through the lead 33 to the panels 32 and 34 thereby simultaneously and proportionately to adjust the regulators 26 so that the pressure will be returned to the desired value.

The master controlling system

The supply of fuel and air for combustion to the furnace is controlled through a master control system in response to steam pressure generated by the boiler or by a series of boilers connected to a common steam header. As shown, steam is supplied to a header 37 which in turn supplies any desired type of steam consuming device, and the system is connected to maintain the steam pressure in the header constant. For this purpose the pressure in the header is measured by a master controlling device 38 which may be similar to the master element in Smoot Reissue Patent No. 16,507, except that it adjusts a variable electrical device rather than a fluid pressure. As seen in the diagrams Figures 2 and 3, the steam pressure unit may control a wiper 39 movable over a resistor 41 which is connected across the control circuit, and the wiper may be connected to a main lead 42 to transmit the master control voltage to control panels. It will be understood that when a plurality of furnaces on a single boiler or on different boilers are controlled from the same master control unit, the lead 42 will go to main control panels for each of the boilers.

As shown in Figure 1, there is only a single furnace 11, and the lead 42 is connected to a panel 43 which is, in effect, the main control panel for the furnace. The lead may also be connected to additional main control panels in parallel with the panel 43, and the several panels enable the ratio of the total load to be carried by each of the furnaces to be adjusted. The panel 43 as well as the additional control panels referred to hereinafter may be identical with the controls 32 and 34.

The output voltage from the control panel 43 passes through a voltage limiting device 44 which may be of the type more particularly described and claimed in my copending application Serial No. 59,061, filed November 9, 1948, now Patent No. 2,529,055, and which functions to maintain the output voltage between predetermined maximum and minimum limits. The voltage limiting device is connected back through the panel through a lead 45 in parallel to a forced draft panel 46 and primary and secondary fuel panels 47 and 48. The forced draft system may be controlled from the panel 46 and a panel 49 to maintain the forced draft pressure at a value proportional to the steam pressure, and the panels 47 and 48 respectively control the supply of coal and air to the furnace in a predetermined ratio.

The forced draft control

The forced draft pressure supplied to the header 19 is measured by a metering type regulator 51 which is similar to the regulator 27 and which is loaded electrically through a motor unit 52 similar to the motor unit 29 on the regulator 27. The panel 46 supplies to the motor unit 52 a voltage which is proportional to the voltage received by the panel 46 from the panel 43 variably to load the regulator. As the regulator moves in response to change in its loading, it transmits back through a lead 53 a control voltage which is supplied to both of the panels 46 and 49 and which is transmitted therefrom to positioning type regulators 54 and 55 which are connected to the valves or louvers 22. Thus, when there is a change in the loading voltage supplied to the regulator 51 a proportionate adjustment of the two regulators 54 and 55 will be produced to change the forced draft pressure an amount proportional to the change in loading on the regulator. When this change has occurred, the reaction of the changed pressure on the regulator will bring it back to balance with the valves 22 in their new adjusted position to maintain the pressure at the desired value.

The fuel control

The two types of fuel illustrated are controlled concurrently and proportionately through the panels 47 and 48 in accordance with changes in the master loading voltage as transmitted by the control device 38. For this purpose the regulator 47 is connected through a lead 56 to a positioning type regulator 57 connected to the metering element 12. Thus, upon any change in the master loading voltage, a proportional change in the loading of the regulator 57 will occur to produce a corresponding increase or decrease in the rate of coal supply.

The gas supply is controlled by a positioning regulator 58 connected to the valve 14 to adjust it, and the gas flow is measured by a metering type regulator 59 having a diaphragm thereon connected across a restriction 61 in the gas supply conduit to measure the gas flow. The regulator 59 has a loading unit 62 similar to the unit 29 connected through a lead 63 to the panel 48 to receive a loading voltage therefrom. The regulator 59 adjusts a potentiometer or the like in the same manner as the regulator 27, and the voltage developed by such potentiometer is transmitted through a lead 64 through the panel 48 and out through a lead 65 to the positioning regulator 58. Thus the gas supply is accurately metered and is changed in proportion to changes in the master loading voltage to vary the supply of gas simultaneously with changes in the coal supply.

The air control

In the system, as illustrated, the primary and secondary air are controlled from the fuel control system so that the supply of air will always be proportional to the supply of fuel. For this purpose voltages developed in the coal and gas control circuits are added by a voltage adding device indicated generally at 66 and are transmitted to a master air regulator 67 which is similar to the regulators 27 and 59 to load it. As shown, the voltage from the coal regulator 47 is conducted through a ratio adjusting device 68 through a winding 69 which is coupled to a secondary winding 71 to the loading element of the regulator 67. The winding 71 is connected through a ratio adjusting resistor 72 to the panel 48, and the windings are so related that a voltage in the winding 71 will induce in the winding 69 an equal voltage of the same polarity as the voltage supplied to the winding 69 so that the voltages will be added, and the total thereof will be impressed on the regulator 67. Thus the air regulator 67 is loaded proportionately to the total amount of fuel supplied to the furnace so that it can supply an amount of air proportional to the total fuel.

The regulator 67 includes a diaphragm unit 73 connected across a restriction in the air manifold 19 to measure the total air flow therethrough and adjusts a potentiometer or similar variable device to develop an output voltage which is transmitted through a lead 74 to a primary air control panel 75 and a secondary air control panel 76. The panel 75 is connected to a positioning regulator 77 which is connected to the primary air valve 16. The secondary air panel 76 is connected to a positioning regulator 78 which controls the secondary air valves 18 so that the primary and secondary air will be adjusted proportionately in response to any change in operating conditions.

The control panels

Figure 2:
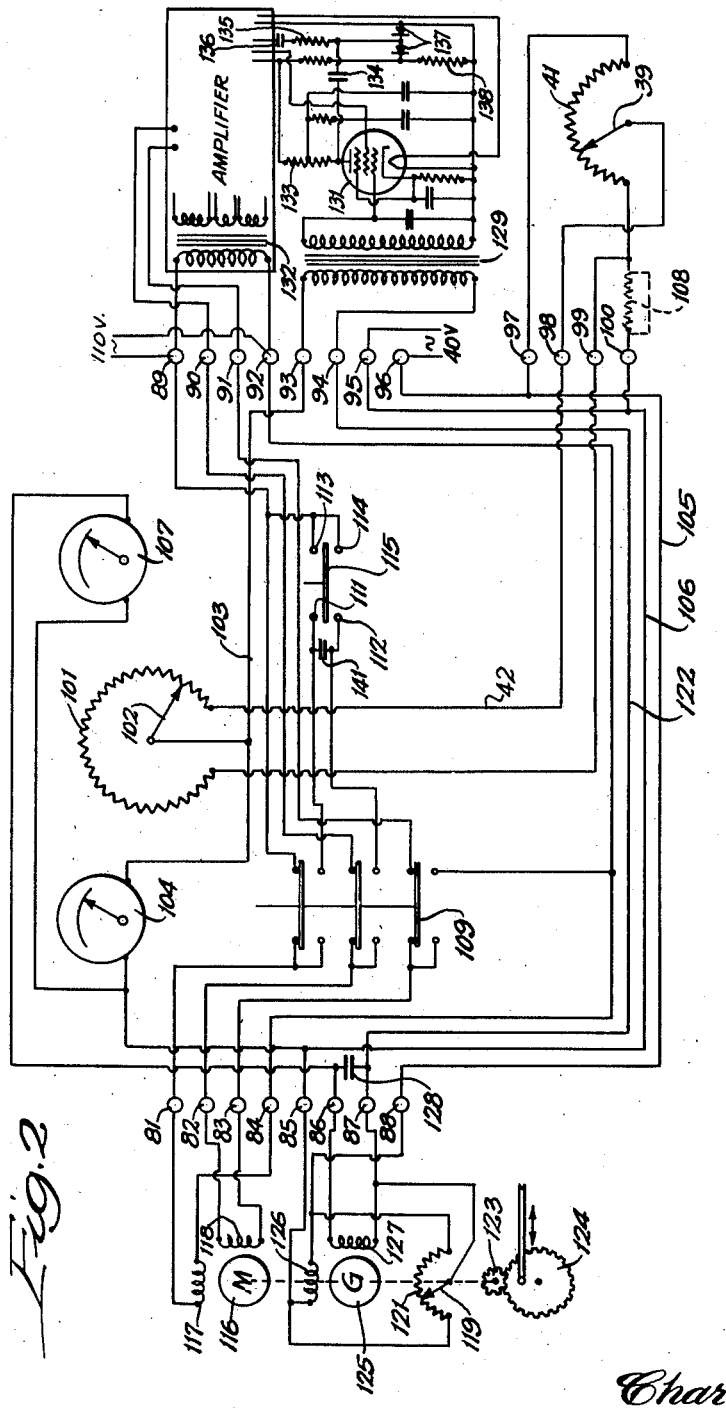
Figure 2 is a wire diagram of a control panel and its interconnected parts.

The several control panels referred to above are all substantially identical and are illustrated diagrammatically in Figure 2 in connection with the associated parts. As shown in Figure 2, the panel per se terminates at its left side in the terminals numbered 81 to 88 inclusive and at its right terminates in the terminals 89 to 100 inclusive. For automatic operation the control panel includes a proportioning resistor 101 whose opposite ends are connected to the terminals 98 and 99 and which has an adjustable wiper 102 connected through a lead 103 to the terminal 93 and to a voltmeter 104. The control resistor 41, which may be representative of the potentiometer adjusted by the main steam pressure element or to the input potentiometer for any one of the several panels, has its opposite ends connected across the terminals 97 and 99. The terminals 95 and 96 may be connected to a source of control voltage such as a 40 volt 60 cycle alternating current source, and the terminal 96 is connected through a lead 105 to the terminal 97 and to the terminal 88. The terminal 95 is connected through a lead 106 and through a resistor 108 to the other end of the potentiometer resistance 41 and to the terminal 85, the voltmeter 104 and a second voltmeter 107. Thus the resistor 41 is supplied with the control voltage from the source and supplies a variable voltage from its wiper 39 to one side of the proportioning resistor 101 in the panel. It will be understood that in those instances wherein several panels are connected in parallel the wiper 39 is connected in parallel to a proportioning resistor 101 in each of the panels in the same manner. In this way the voltage impressed across the proportioning resistor in each of the panels will be the same and will vary in the same manner upon adjustment of the wiper 39. The wiper 102 in each panel may be manually adjusted to proportion the effects of the several panels connected in parallel so that, for example, in the fuel control system a greater variation in coal supply than in gas supply will be produced on a change in steam pressure, but the variations will in each case be proportional.

The panel further includes a transfer switch 109 to transfer the panel from automatic to manual operation. The switch is shown in its automatic position in which three blades thereon connect an upper set of contacts between the terminals 81 and 89, a central blade connects contacts between the terminal 82 and terminal 90, and a lower blade connects contacts between the terminal 83 and terminal 91. When the switch is pushed down to its manual position, the upper blade will connect the terminal 81 with a manual switch contact 111, the center blade will connect the terminal 82 with a manual switch contact 112, and the lower blade will connect the terminal 83 with the terminal 84 and the terminal 92. The manual switch includes an additional pair of contacts 113 and 114 which are connected to the terminal 89 and a blade 115 which is movable from an upper position connecting contacts 111 and 113 to a lower position connecting contacts 112 and 114.

The panel is connected through the terminals 81 to 88 inclusive to a regulator indicated diagrammatically in Figure 2 and particularly to the motor loading unit such as that shown at 29 or 62 of such a regulator. This motor unit comprises a two phase motor having a rotor 116 energized by a main field 117 and a control winding 118. The main winding 117 may be energized from a standard source of supply such as 110 volt 60 cycle source, as indicated on the drawing and may have its opposite sides connected to the terminals 81 and 84. The control winding is connected to the terminals 82 and 83, as shown, and when it is supplied with alternating current leading or lagging the current in the main winding, the motor will turn in one direction or the other, as is well understood in the art. The motor shaft is connected to a movable wiper 119 movable over a potentiometer resistance 121 which is connected across the terminals 85 and 88, as shown, to be supplied with control voltage from the leads 105 and 106. The wiper is connected to the terminal 87 which is connected through a lead 122 to the terminal 94. The motor shaft may also drive a pinion 123 meshing with a gear 124 in the regulator to load the regulator, as will be described more fully hereinafter.

The motor unit also includes a rebalancing or anti-hunting generator having a rotor 125 connected to the motor shaft to be driven thereby and a pair of field windings 126 and 127. The field winding 126 is connected across the terminals 85 and 88 to receive the control voltage therefrom while the winding 127, which is, in effect, the output winding, is connected across the terminals 86 and 87 between which a condenser 128 is connected to insure proper phasing of the output voltage.

The motor is controlled through an amplifier whose input stage is illustrated in detail and which may have any desired additional number of stages to produce the desired amplification. The input of the amplifier comprises a transformer 129 whose primary winding is connected across the terminals 93 and 94 and whose secondary winding is connected to the control grid of a pentode tube 131. The amplifier is supplied with power from a transformer 132 which is connected across the terminals 89 and 92 to receive 110 volt alternating current therefrom, and the amplifier output is connected to the terminals 90 and 91. The first stage of the amplifier, as shown, comprises the pentode tube with its plate connected across a resistor 133 to a suitable B supply source in the amplifier which is powered from the transformer 132. The plate is also connected through a condenser 134 and a resistor 135 to the control grid for the second stage of amplification. The resistor 135 is connected through a condenser 136 to the grid of the second amplifier stage, and the point between the condenser 134 and resistor 135 is connected to the center point between a pair of rectifiers 137. The rectifiers 137 are in series between the common ground terminal of the circuit and a point above a resistor 138 which is connected between the B supply and ground. This circuit forms a clipper circuit to limit maximum and minimum voltage swings on the second amplifier stage to prevent overloading and peaking of the amplifier in the event an excessive control voltage is applied thereto.

Figure 3:
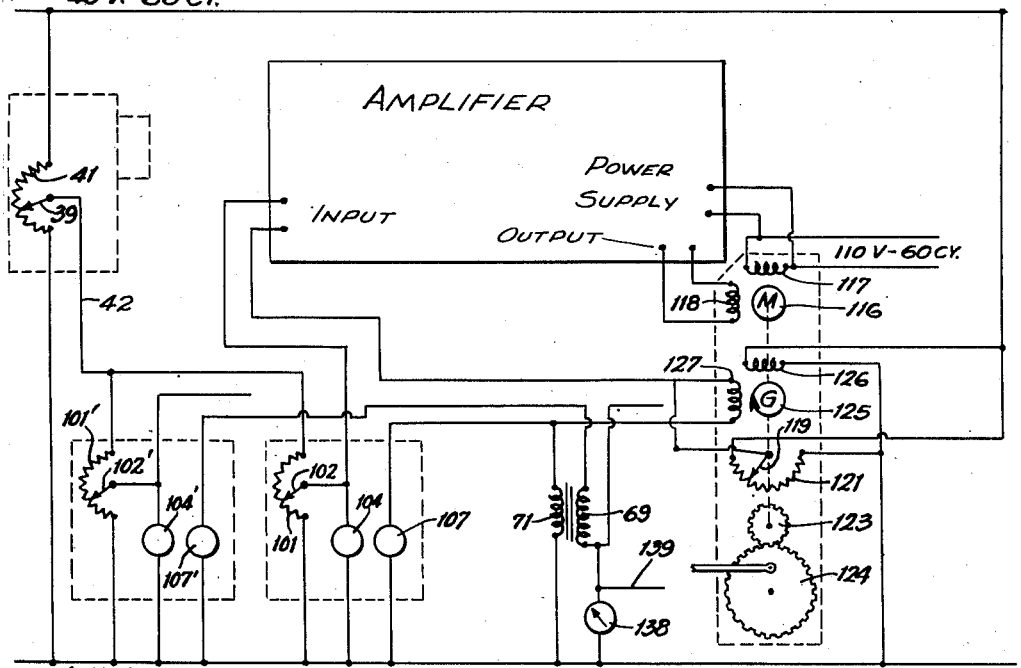
Figure 3 is a wiring diagram showing the condition of the circuit for automatic operation.

In operation the upper end of resistor 133 will be at a constant D. C. value such as plus 2 volts, and due to the fact that the rectifiers are not perfect, the point between the rectifiers will be at a smaller value such as plus 1 volt. Thus the point in the connection between the plate of the first tube and the grid of the second tube cannot exceed a value of more than one volt plus or minus so that the A. C. signal supplied to the second amplifier stage is limited by the circuit described to one volt plus or minus. In this way overloading of the amplifier is prevented and clipping of the signal is accomplished without a separate source of bias voltage. In operation of the panel circuit, as described, when the switch 109 is set for automatic operation, the condition of the circuit is, as shown in Figure 3. As illustrated in this figure, the wiper 39 of the main potentiometer is connected to the proportioning resistor 101 and is parallel to a similar proportioning resistor 101' in a similar panel. The two panels such, for example, as the primary and secondary air panels may be identical, and corresponding parts therein are indicated by the same reference numerals which are primed in the case of the second panel. While the complete circuit for the second panel has not been shown, it will be understood that it controls a motor unit through an amplifier in the same manner as the first panel.

When the voltage at the wiper 102 on the panel is equal to the voltage at the wiper 119 in the regulator, it will be seen that the circuit is in balance. At this time the input to the amplifier is zero, and no current is supplied to the control winding 118 of the motor. The motor is, therefore, stationary. Due to the fact that the resistors employed in the potentiometers present a relatively low impedance compared with the meters 104 and 107, the meter 104 will indicate the voltage at the wiper 102, and the meter 107 will indicate the voltage at the wiper 119 which is indicative of the position of the regulator. During automatic operation, since these voltages are normally equal, the meters will be together. Assuming now that there is an adjustment of the wiper 39 to change the voltage supplied to the potentiometer resistor 101, the circuit connecting this resistor to the potentiometer 121 will be unbalanced, and a control voltage will be supplied to the control winding of the amplifier whose amplitude is proportional to the amount of unbalance and whose phase is controlled by the direction of unbalance. The amplifier will then supply to the motor control winding 118 a control current which will cause the motor to turn in a direction determined by the phase of the current with respect to the phase of the current in the 110 volt supply line and at a speed proportional to the amount of the unbalance. As the motor turns it will drive the generator rotor 125 which generates in the winding 127 an alternating voltage of opposite phase to the unbalance to reduce the control voltage thereby to prevent overshooting and hunting. At the same time the motor will turn the gears 123 and 124 to adjust the regulator and through it to effect a control operation. As the motor turns, the wiper 119 will be moved in a direction to return the circuit to balance, and when the voltage in the wiper 119 is equal and opposite to the voltage at the wiper 102, the system will again be balanced, and the motor will stop. While this is occurring, the motor unit connected to the wiper 102' will simultaneously be readjusted to balance the new voltage value in the wiper 102' so that the control operations are effected simultaneously.

Figure 3 also illustrates in somewhat more detail the connection of the voltage totaling device in the circuit. As shown, the primary winding or coil 71 is connected in shunt with the meter 107 so that it will have impressed thereon the voltage developed at the wiper 119. The secondary coil 69 is connected in series with the lead from the meter 107' to its associated potentiometer wiper in its motor unit, and there is a connection from the lower end of the coil 69 through a meter 138 providing a high impedance to the ground line of the control circuit. The lead from the totalizing device shown at 139 is connected between the meter 138 and the winding 69.

In operation the voltage developed at the wiper connected to the meter 107' will be impressed across the meter 138 on the line 139, and the voltage in the primary winding 71 will be induced in the winding 69 and added to the first mentioned voltage. Therefore, the total voltage on the lead 139 will be the sum of the two wiper voltages. In case more than two panels are to have their voltages totaled, the lead 139 might supply a second primary winding similar to the winding 71 which is coupled to a secondary winding similar to the winding 69 connected to a third panel to total the voltages in the three panels. It will be understood that this arrangement could be extended, if desired, to total any desired number of panel voltages. Due to the fact that the impedances in the circuit are all high and that current flow is small, there is no cross feeding between the circuits so that a change, for example, in the voltage at the wiper 102' will not affect the motor 116.

Figure 4:
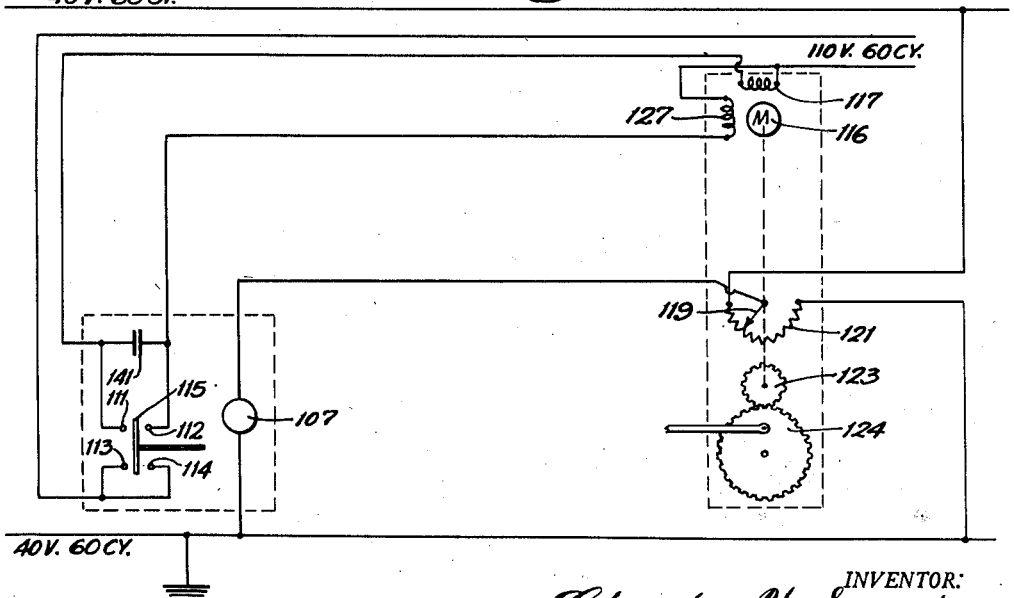
Figure 4 is a similar diagram showing the condition of the circuit for manual operation.

For manual operation when the switch 109 is moved down as seen in Figure 2, the circuit becomes, in effect, that of Figure 4. In the manual condition each regulator motor unit is controlled separately from its own panel so that there is no interconnection whatever between the circuits, and a single motor circuit only is, therefore, shown in Figure 4.

In this condition of the circuit, the motor control winding 127 is connected to one side of the 110 volt source and has its other side connected to the switch contact 112. The contact 111 is connected to one side of the main winding 117 to which the other side of the control winding is also connected, and both of the contacts 113 and 114 are connected to the other side of the 110 volt circuit. A condenser 141 is connected between the contacts 111 and 112.

With the manual switch blade 115 in its central position, as shown, neither of the motor windings is energized, and the motor is stationary. When the blade 115 is shifted to the right to connect the contacts 112 and 114, the main motor winding 117 is energized through the condenser 141 and the switch to the line while the control winding 127 is connected directly in the line. Therefore, the current in the main winding will lead that in the control winding to rotate the motor in one direction. When the switch is moved to the left to connect contacts 111 and 113, the main winding is directly energized from the line while the control winding is energized through the condenser 141. At this time the current in the main winding lags the current in the control winding to rotate the motor in the opposite direction. The motor will continue in operation as long as the switch is held in one of its operating positions and will move the wiper 119 to indicate on the meter 107 the position of the regulator.

It will be seen that the system can be converted from automatic to manual operation at any time simply by throwing the switch 109 since the voltages in the bridge connected potentiometers are always equal during automatic operation as indicated by the two meters 104 and 107. Therefore, when the switch 109 is thrown to manual position, there will be no immediate effect on the system. During manual operation, the meter 104 will indicate the voltage at the wiper 102 and will, therefore, indicate the position the regulator would occupy if it were under automatic control. The meter 107 will indicate the actual position of the regulator, and since these may not be the same, the system should be manually adjusted to bring them into agreement before switching from manual to automatic control. Otherwise, as soon as the system is switched to automatic control, it will cause a rapid and perhaps drastic adjustment of the regulators to bring them to the indicated automatic position, and while this will not damage the control system itself, it might result in severe damage to the boiler or other plant being controlled.

*The metering regulators*

Figures 5 and 6 illustrate diagrammatically the construction of the metering regulators, as shown, for example, at 27, 51, 59 and 67 of Figure 1. In the construction shown the reversible motor, as shown at 116 in Figures 2 and 3, is mounted on the cover plate 142 of a motor unit housing 143 which is formed for mounting on the regulator itself. The generator, as indicated at 125 may also be contained in the motor housing, and electrical connections to the unit may be made through a plug type connector 144 carried on the cover plate 142. The motor drives a pinion 145 journaled on the cover plate and meshing with a gear 146 also journaled on the cover plate and driving a shaft 147 through bevel pinions 148. This entire mechanism, as described, is supported on the cover plate 142 on brackets 149 so that access to any part of the mechanism for repair or replacement can easily be obtained simply by removing the cover plate without disturbing any other parts of the mechanism.

The shaft 147 drives the wiper 119 which is movable over the resistor 121 to form the balance potentiometer of the motor unit. The shaft also carries a cam 151 which may be adjustably mounted thereon and shaped to provide any desired characteristic of regulator operation.

The cam engages one end of a lever 152 carried by a shaft 153 journaled in the housing and carrying at its opposite end an arm 154 which is connected to a tension spring 155. The spring 155 serves to load a pivoted beam forming a part of the regulator and which is balanced by a diaphragm 157. The beam has connected thereto a valve plunger 158 which moves toward and away from a nozzle 159 to vary the pressure behind the nozzle.

The regulator comprises a fluid pressure motor including a housing 161 formed with a pair of cylinder bores of different sizes into which a small piston 162 and a large piston 163 slidably fit. Fluid under pressure such as air is supplied to the top of the small piston through a line 164 which also communicates through a restriction 165 with the space below the large piston. The nozzle 159 is also connected to the space below the large piston. The pistons are interconnected by a piston rod 166 formed with a rack meshing with a pinion 167 which is connected to the potentiometer wiper 168 to adjust the output voltage of the potentiometer.

In operation the motor 116 will be moved to a position corresponding to the input voltage to the motor and until the input voltage is rebalanced by adjustment of the potentiometer wiper 119. As the motor moves, it turns the cam 151 to vary the tension on the spring 155 thereby varying the restriction of the nozzle 159. As this nozzle becomes more restricted the pressure below the large piston 163 will increase causing the pistons to move up and adjusting the wiper 168 in one direction, and when the nozzle is less restricted, the pressure below the large piston will decrease causing the pistons to move down and to adjust the wiper 168 in the opposite direction. This will vary the voltage developed at the wiper 168 and will affect a corresponding control adjustment through the connected panels and positioning type regulators to vary the pressure or differential pressure on the diaphragm 157 to rebalance the beam 156. At this time the system is again in balance, and the regulator will remain in its adjusted position until there is a further change either in the motor unit or in the pressure acting on the diaphragm 157.

*The positioning regulators*

Figure 7 illustrates the construction of the several positioning regulators as shown, for example, at 26, 54, 55, 57, 77 and 78 of Figure 1. Each of these regulators includes a motor unit which is identical to the motor unit for the meter type regulators with the exception that the cam 151 is omitted. For brevity of description parts in Figure 7 corresponding to identical parts in Figures 5 and 6 have been indicated by the same reference numerals.

In this construction the shaft 147 carries a disc 171 having a link 172 pivoted eccentrically thereto so that the link will be shifted lengthwise as the shaft turns. The motor unit housing may be mounted on the top of a positioning type regulator such as that more particularly shown and described in the patent to Rosenberger, No. 2,220,176, in place of the diaphragm unit shown in the patent. As illustrated diagrammatically in Figure 7, the regulator includes a floating link 173 to the center of which the link 172 is pivoted and which is pivotally connected at one end to the valve rod of a pilot valve 174. At its opposite end the link 173 is connected to one end of a bell crank lever 175 pivoted at 176 and having its opposite end connected through a link 177 to an elongated pivoted cam 178. The cam is engaged by a roller 179 carried on the piston rod 181 of a fluid motor 182 which is controlled by the pilot valve 174.

In operation, when the bridge circuit controlling the motor 116 becomes unbalanced the motor will rotate the shaft 147 and through the eccentric disc 171 will move the link 172 to rock the link 173 either upward or downward about its pivotal connection to the bell crank lever 175. This will shift the pilot valve causing the fluid motor 182 to move the piston rod and rock the cam 178. The cam acting through the link 177 will rock the bell crank 175 thereby shifting the left end of the floating link 173 to position to return the pilot valve to its neutral position thereby to stop the motor. Thus the regulator will move to a position corresponding to the position of the motor 116 and will simultaneously move its interconnected valve or other control element to effect a control operation.

*Operation*

In operation of the system, as shown, for example, in Figure 1, for a boiler furnace control, it will be seen that as long as the steam pressure in the manifold 37 remains constant the system will remain stationary in its then adjusted position. Upon variation in steam pressure the controller 38 will adjust its potentiometer to change the voltage transmitted to the control panels through the lead 42. This will change the voltage impressed on the proportioning resistor of the panel 46 to change the loading on the forced draft regulator 51 which will, in turn, change the voltage transmitted back to the control panels 46 and 49. These panels will effect an adjustment of the position type regulators 54 and 55 to adjust the dampers 22 thereby to change the forced draft pressure to a value proportional to the new value of the voltage developed at the master control unit 38.

At the same time the voltages supplied to the primary and secondary fuel panels 47 and 48 will be changed to adjust the primary and secondary fuel regulators proportionally to the change in the master control voltage. It will be noted that the proportion of primary to secondary fuel can be adjusted at any time by adjusting the potentiometers at one or both of the fuel control panels so that the desired amounts of the different fuels can be furnished. The changes in the voltages at the fuel panels will result in a change in the loading voltage transmitted to the regulator 67 through the totalizing unit and will cause an adjustment of this regulator to change the voltage transmitted by it through the lead 74 to the air control panels 75 and 76. These panels will cause proportional adjustments of the regulator 77 and 78 to change the primary and secondary air flow in proportion to the change in fuel supply. It will again be noted that the relative amounts of primary and secondary air can readily be adjusted by adjusting the proportioning potentiometer at the air control panels to maintain the primary and secondary air in the desired ratio at all times.

The several adjustments effected by the system will occur simultaneously and the system can be so arranged as to produce very rapid adjustment so that any change in operating conditions is quickly and accurately corrected for. Also due to the use of the generators in the motor circuits overshooting or hunting is prevented so that all parts of the system will quickly come to the correct position of adjustment and will stop without any hunting or overshooting.

While the system has been illustrated and has specifically been described in connection with the control of combustion, it will be apparent that it is not limited thereto but is applicable to many types of control operations and is capable of being connected and utilized in many different manners depending upon the control requirements.

It will, therefore, be understood that the invention is not limited to the exact system illustrated and described nor otherwise than by the terms of the appended claims.

What is claimed is:

1. A control system comprising a primary variable impedance, a plurality of impedance elements connected in parallel to the primary impedance, a plurality of secondary variable impedances, a plurality of circuits connecting the impedance elements respectively to the secondary impedances, a plurality of reversible motors connected respectively to the secondary impedances to adjust them, means responsive to voltage unbalance in the circuits to control the respective motors, voltage adding means connected to the secondary impedances to add the voltages developed therein, and a regulator connected to the voltage adding means to respond to the sum of said voltages.

2. A control system comprising a primary variable impedance, a plurality of impedance elements connected in parallel to the primary impedance, a plurality of secondary variable impedances, a plurality of circuits connecting the impedance elements respectively to the secondary impedances, a plurality of reversible motors connected respectively to the secondary impedances to adjust them, means responsive to voltage unbalance in the circuits to control the respective motors, voltage adding means connected to the circuits to add the voltages developed across one of the impedances in each circuit, and a regulator responsive to the total voltage developed in the voltage adding means.

3. A control system comprising a primary variable impedance, a plurality of impedance elements connected in parallel to the primary impedance, a plurality of secondary variable impedances, a plurality of circuits connecting the impedance elements respectively to the secondary impedances, a plurality of reversible motors connected respectively to the secondary impedances to adjust them, means responsive to voltage unbalance in the circuits to control the respective motors, a pair of inductively coupled windings connected respectively to the circuits to have impressed thereon the voltages developed across one of the impedances in each circuit, and a regulator connected to one of the windings and responsive to the total voltage developed therein.

4. A control system comprising a regulator movable in response to a condition to be controlled, an adjustable electrical device connected to and adjusted by the regulator to produce a change in an electrical effect proportional to movement of the regulator, a reversible electric motor, a regulator to control a second condition affecting the first named condition, a spring adjusted by the motor variably to load the last named regulator, an element responsive to said second condition to balance the spring, a second adjustable electrical device adjusted by the last named regulator, a balanced electrical network connecting the electrical devices in opposition to each other, and means connected to the network and responsive to unbalance thereof to control the motor.

5. A control system comprising a regulator movable in response to a condition to be controlled, an adjustable electrical device connected to and adjusted by the regulator to produce a voltage change, a plurality of impedance elements connected in parallel to said device, a plurality of variable impedances, circuits connecting the variable impedances respectively to the impedance elements, a plurality of reversible motors, means responsive to the voltage unbalance in the circuits to control the motors respectively, a plurality of secondary regulators controlled by the motors respectively, and individual control means for a plurality of factors affecting the condition controlled by the regulators respectively.

6. A control system comprising a regulator movable in response to a condition to be controlled, an adjustable electrical device connected to and adjusted by the regulator to produce a voltage change, a plurality of impedance elements connected in parallel to said device, a plurality of variable impedances, circuits connecting the variable impedances respectively to the impedance elements, a plurality of reversible motors, means responsive to the voltage unbalance in the circuits to control the motors respectively, a plurality of secondary regulators controlled by the motors respectively, individual control means for a plurality of factors affecting the condition controlled by the regulators respectively, and means to adjust at least one of the impedance elements to vary the ratio of operation of the secondary regulators.

7. A control system comprising a regulator movable in response to a condition to be controlled, an adjustable electrical device connected to and adjusted by the regulator to produce a voltage change, a plurality of impedance elements connected in parallel to said device, a plurality of variable impedances, circuits connecting the variable impedances respectively to the impedance elements, a plurality of reversible motors, means responsive to the voltage unbalance in the circuits to control the motors respectively, a plurality of secondary regulators controlled by the motors respectively, individual control means for a plurality of factors affecting the condition controlled by the secondary regulators respectively, a voltage totaling device connected to the circuits to add the voltages developed across one impedance in each circuit, a third regulator connected to the voltage totaling device to respond to the total voltage developed therein, an adjustable electrical device connected to and adjusted by the last named regulator, a plurality of fourth regulators respectively controlling factors affecting the condition, and means responsive to the last named electrical device controlling the last named regulators.

8. A combustion control system for a steam boiler supplied with a plurality of different fuels and air for combustion comprising a regulator responsive to a function of the steam generated by the boiler, an adjustable electrical device connected to and adjusted by the regulator to produce a voltage change, a plurality of impedance elements connected in parallel to said device, a plurality of regulators controlling the supply of different fuels to the boiler, reversible motors controlling the regulators, adjustable impedances controlled by the motors, circuits connecting the adjustable impedances respectively to the impedance elements, means responsive to voltage unbalance in the respective circuits to control the motors, means to add the voltages developed across one of the impedances in each circuit, and means responsive to the total voltage developed in the adding means to control the supply of air to the boiler.

CHARLES H. SMOOT.

References Cited in the file of this patent

UNITED STATES PATENTS

| Number | Name | Date |
| --- | --- | --- |
| 890,458 | Schley | June 9, 1908 |
| 1,086,729 | Rey | Feb. 10, 1914 |
| 1,586,233 | Anschutz-Kaempfe | May 25, 1926 |
| 1,892,135 | Bristol | Dec. 27, 1932 |
| 1,989,829 | Specht | Feb. 5, 1935 |
| 2,002,353 | Reinken | May 21, 1935 |
| 2,061,410 | Stablein | Nov. 17, 1936 |
| 2,073,346 | Kuempel | Mar. 9, 1937 |
| 2,115,086 | Riggs | Apr. 26, 1938 |
| 2,211,300 | Spence | Aug. 13, 1940 |
| 2,232,077 | Rosecky | Feb. 18, 1941 |
| 2,336,492 | MacKay | Dec. 14, 1943 |
| 2,371,590 | Brooke, Jr., et al. | Mar. 13, 1945 |
| 2,390,793 | Jones | Dec. 11, 1945 |
| 2,393,748 | Burns | Jan. 29, 1946 |
| 2,420,539 | Hornfeck | May 13, 1947 |
| 2,432,422 | Hornfeck | Dec. 9, 1947 |
| 2,470,820 | Hull | May 24, 1949 |
| 2,471,872 | Hunt | May 31, 1949 |
| 2,476,657 | Glass | July 19, 1949 |
| 2,492,392 | Moseley | Dec. 27, 1949 |